Oct. 12, 1954          L. N. YOHE          2,691,245
FLOWERPOT RECEPTACLE
Filed May 5, 1952
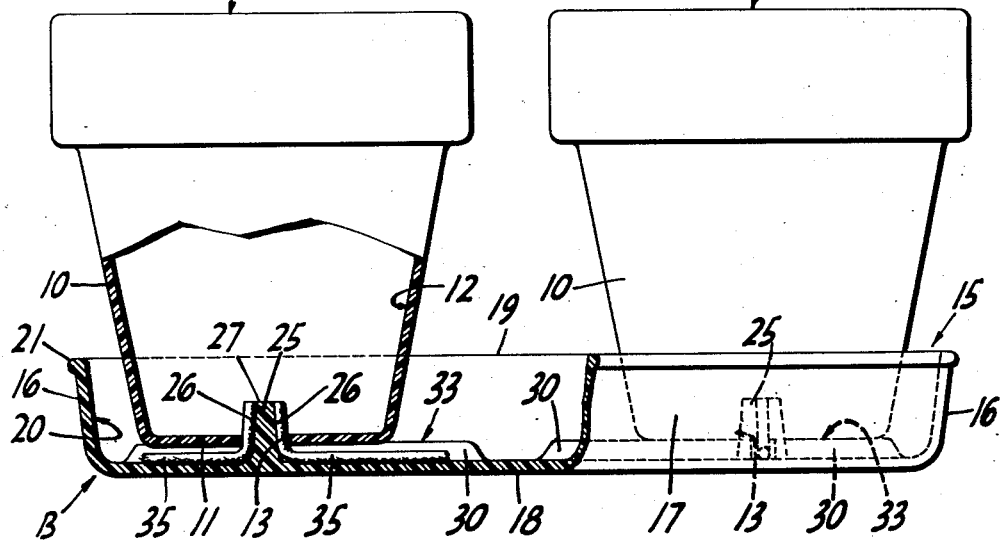
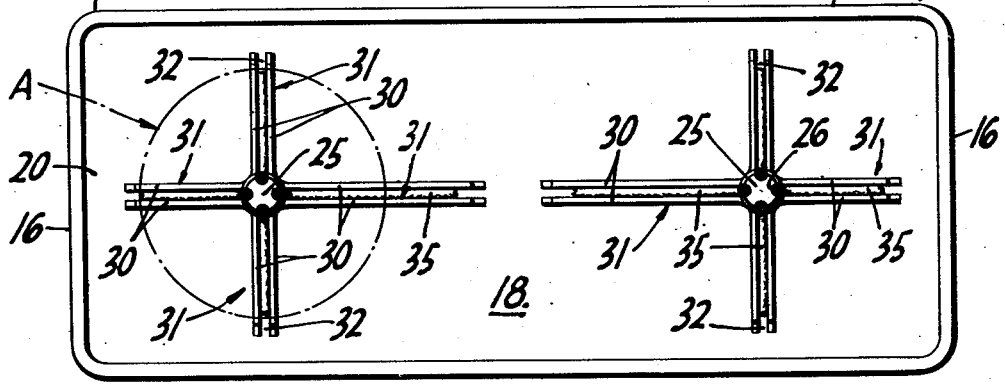
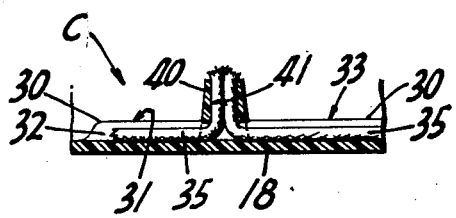
INVENTOR.
LESTER N. YOHE
BY
Lancaster, Allwine & Rommel
HIS ATTORNEYS Patented Oct. 12, 1954

2,691,245

UNITED STATES PATENT OFFICE 2,691,245

FLOWERPOT RECEPTACLE

Lester N. Yohe, Havertown, Pa.

Application May 5, 1952, Serial No. 286,066

6 Claims. (Cl. 47—38)

This invention relates to flower-pot receptacles, trays or saucers.

The conventional flower-pot is adapted to rest upon the inner face of the bottom of a flower-pot saucer, which saucer prevents moisture, incident to watering or fertilizing, from damaging a surface upon which the flower-pot might otherwise be placed. While water or solutions of chemical plant food may be placed in the flower-pot saucer, to be carried to the soil in the flower-pot, such water or solution will seek the same level in the pot as in the saucer and it is generally undesirable to have a water table in the soil of the flower-pot, at least to a height so the water touches the roots of the plant within the pot, nor is it desirable that capillary attraction carry water or solution too rapidly from a saucer to the soil.

An important object of this invention is to provide a flower-pot saucer, tray or receptacle, hereinafter called receptacle, which is provided with triple function means to raise the bottom of a conventional flower-pot above the inner face of the receptacle and to form holders for wicks or the like which are adapted to extend through the conventional opening in the bottom of the pot and conduct moisture to the soil within the pot from water or solution within the receptacle so that the bottom may be above the level of the water or solution, yet the water or solution will be fed to the soil in the pot. Additionally, this means provides devices to strengthen a holder forming a part of the new receptacle and to be referred to next.

Another important object is to provide, in association with the means just described, a holder constructed and arranged to extend through the conventional opening in the bottom of the flower-plot to limit shifting of the pot with respect to the receptacle and, in addition, to form portions of the wick holders.

A further important object is to provide a one-piece receptacle for one or more conventional flower-pots, having the novel features described above and which may be readily molded, and the wicks subsequently inserted quickly and without difficulty.

Yet another important object is to provide means to raise a flower-pot off a flat surface so that air may enter through the conventional opening in the bottom of the flower-pot.

Additionally, an important object is to provide receptacles for flower-pots which receptacles are readily cleaned, may be stored in nested condition, and are of pleasing appearance.

Other objects and advantages of the invention will be apparent during the course of the following detailed description of the invention, taken in connection with the accompanying drawing, forming a portion of this disclosure and in which drawing:

Fig. 1 is a view partly in side elevation and partly in vertical section of the new receptacle, with two conventional flower-pots associated therewith.

Fig. 2 is a top plan of the new receptacle.

Fig. 3 is a fragmentary vertical section of a modification of the receptacle of Figs. 1 and 2.

In the drawings, wherein for the purpose of illustration are shown two forms of the invention and wherein similar reference characters designate corresponding parts throughout the several views, the letter A designates a conventional flower-pot; B, one form of the invention and C, another form thereof.

The flower-pot A is shown as provided with a downwardly-converging truncated, conical wall 10 joining a bottom wall 11 and defining an upwardly-opening cell 12 to receive, for example, drainage material over the bottom wall 11, soil and a plant or plants (not shown). The bottom wall 11 is provided with a small central circular opening 13 extending to the cell 12.

Referring to Figs. 1 and 2, the form B of the invention preferably comprises an integral receptacle 15 having opposite end walls 16 joining opposite side walls 17 and all joining a bottom wall 18. The walls 16 and 17 may diverge upwardly to a mouth 19 so that an upwardly-opening flower-pot-receiving chamber 20 is provided. The upper edges of the walls 16 and 17 may be rolled as at 21 and the junctures of the walls 16 and 17 and 16, 17 and 18 are preferably curved.

Extending upwardly from the bottom wall 18 is one or more preferably truncated-conical holders or projections 25, each constructed and arranged to extend through an opening 13 of the flower-pot A. Intermediate its ends, the diameter of the holder 25 is slightly less than the diameter of this opening. The holder 25 is provided with means to accommodate portions of wicks 35 which comprise the walls of a plurality of grooves 26 which extend from the base of the holder upwardly to open, at their upper end, to the upper face 27 of the holder. Preferably, there are four such grooves 26 and they provide holders for portions of the wicks 35 to be subsequently described. This structure provides means both to limit shifting of the flower-pot A, when the holder 25 is inserted into the opening 13 of the flower-pot as in Fig. 2, and to provide portions of the wick holders for association with the structure next to be described.

Preferably extending upwardly from the bottom wall 18 are pairs of spaced-apart horizontally elongated walls 30 which may be integral with the bottom wall 18. For example, there may be four pairs 31 of such walls 30 extending to the holder 25 and with the longitudinal axes of the channels 32 thus formed by the walls 30 and adjacent portions of the bottom wall 18, spaced 90° apart. The channels 32 open to the grooves 26. It will be noted that the heights of the walls 30 are the same, and each wall 30 may have a height, for example, of three-quarters of an inch. However, the height of each wall may be greater or less than this. The upper edges 33 of the walls 30 are preferably flat and these spaced-apart pairs of walls raise the bottom walls 11 of the flower-pots A above the bottom wall 18 of the receptacle 15. In addition they provide holders for portions of the wicks 35 and, moreover, provide means to strengthen the holders 25 against breaking off at their bases, since the receptacle 15, holders 25 and walls 30 may be of ceramic or other hardened plastic material.

It is now clear that the flower-pot A, mounted upon the holder 25 and upper edges 33 of the walls 30 can neither shift nor cant excessively to the extent where it will accidently tip over.

The wicks 35 may be elongated lengths of suitable material as cellulose fabric, fiber glass strands or the like. Preferably the lengths are cylindrical and they fit into the channels 32 but do not extend to the upper edges 33 of the walls 30 but fill in the grooves 26. This tends to prevent soil from washing down through the opening 13 in the bottom wall 11 of the flower-pot A. While four wicks 35 are shown, it is now clear two lengths may be provided for each holder 25 with the intermediate portions of the two wicks extending over the upper face 27 of the holders 25.

The form C of the invention, shown in Fig. 3 is exactly like the form B except that the holder 40 is not grooved but its means to accommodate portions of the wicks 35 (the wicks being alike in either form) is at least one bore 41 extending in substantial parallelism to the vertical axis of the holder 40 and open, at its lower end, to channels 32, and with the upper end of the bore 41 open to the upper face of the holder 40. Otherwise, similar reference characters are employed for both forms.

In the form B, the wicks 35 are simply laid into the grooves 26 and channels 32 while, in the form C, the wicks are readily threaded through the bore 41 and extend along the adjoining channels 32.

The level of the water or solution in the receptacle 15 is preferably maintained below the upper edges 33 of the walls 30, so that there will be no water table within the cell 12 of the flower-pot A.

While accommodation is made for two flower-pot in Figs. 1 and 2 the receptacle 15 may accommodate one or more than two flower-pots, depending upon the size of the receptacle and number of holders and pairs 31 of the walls 30.

Various changes may be made to the forms of the invention herein shown and described without departing from the spirit of the invention or scope of the claims.

What is claimed is:

1. A soil-watering receptacle for a flower-pot having a bottom drainage opening, said receptacle having walls, including a bottom wall, defining an upwardly-opening reservoir chamber; means to limit shifting of said flower-pot when within said chamber and to provide a wick-holder, comprising an elongated projection extending upwardly from said bottom wall and constructed and arranged to engage the wall of said opening and provided with an upper face and wick-receiving opening extending into said projection and to said upper face; a wick of moisture-conducting material disposed within said wick-receiving opening; and means to support said flower-pot above said bottom wall, and to provide a channel for said wick and strengthen said projection, comprising a pair of spaced-apart, substantially parallel walls extending upwardly from and secured to said bottom wall, extending to said projection and, with the adjacent portion of said bottom wall, defining a channel merging directly into said wick-receiving opening, with the longitudinal axes of said wick-receiving opening and said channel intersecting, with a portion of said wick within said channel.

2. A receptacle according to claim 1 characterized in that said wick-receiving opening is a groove with the wall surfaces thereof arcuate in transverse section and said wick fits snugly within said groove.

3. A receptacle according to claim 1 characterized in that said receptacle comprises an integral structure.

4. A receptacle according to claim 1 characterized in that said wick-receiving opening is a bore.

5. A receptacle according to claim 1 characterized in that said wick-receiving opening is a bore extending longitudinally of said projection.

6. A receptacle according to claim 1 characterized in that said wick-receiving opening is a groove, said groove is of substantially the same depth throughout its length and said wick substantially fills the groove from upper to lower ends of the groove.

References Cited in the file of this patent

UNITED STATES PATENTS

| Number | Name | Date |
|---|---|---|
| 1,216,642 | White | Feb. 20, 1917 |
| 2,120,599 | Brown | June 14, 1938 |

FOREIGN PATENTS

| Number | Country | Date |
|---|---|---|
| 183,168 | Germany | Apr. 2, 1907 |
| 453,258 | France | Apr. 5, 1913 |